(12) United States Patent
Ferlitsch

(10) Patent No.: US 7,339,687 B2
(45) Date of Patent: Mar. 4, 2008

(54) LOAD-BALANCING DISTRIBUTED RASTER IMAGE PROCESSING

(75) Inventor: Andrew R. Ferlitsch, Tigard, OR (US)

(73) Assignee: Sharp Laboratories of America, Camas, WA (US)

( * ) Notice: Subject to any disclaimer, the term of this patent is extended or adjusted under 35 U.S.C. 154(b) by 886 days.

(21) Appl. No.: 10/261,885

(22) Filed: Sep. 30, 2002

(65) Prior Publication Data

US 2004/0061892 A1 Apr. 1, 2004

(51) Int. Cl.
 *G06F 3/12* (2006.01)
 *G06F 15/00* (2006.01)
 *G06K 1/00* (2006.01)

(52) U.S. Cl. .................... 358/1.13; 358/1.9; 358/1.13; 358/1.15; 358/1.16; 358/1.18

(58) Field of Classification Search .............. 358/1.15, 358/1.13, 1.14, 1.16, 1.1, 1.17, 1.9, 1.18; 345/961

See application file for complete search history.

(56) References Cited

U.S. PATENT DOCUMENTS

| | | |
|---|---|---|
| 4,949,280 A | 8/1990 | Littlefield |
| 4,951,280 A | 8/1990 | McCool et al. |
| 5,287,194 A | 2/1994 | Lobiondo |
| 5,333,246 A | 7/1994 | Nagasaka |
| 5,923,013 A * | 7/1999 | Suzuki et al. ............... 235/375 |
| 5,978,563 A | 11/1999 | Kawamoto et al. |
| 5,987,226 A | 11/1999 | Ishikawa et al. |
| 6,327,050 B1 * | 12/2001 | Motamed et al. .......... 358/1.18 |
| 6,449,053 B2 * | 9/2002 | Bando ....................... 358/1.15 |
| 6,891,632 B2 * | 5/2005 | Schwartz ................... 358/1.15 |
| 6,930,798 B1 * | 8/2005 | Kaneko ...................... 358/1.9 |
| 7,016,061 B1 * | 3/2006 | Hewitt ...................... 358/1.15 |
| 2001/0043358 A1 | 11/2001 | Schwartz |
| 2002/0102119 A1 | 8/2002 | Christodoulou et al. |

FOREIGN PATENT DOCUMENTS

| | | |
|---|---|---|
| JP | 8305507 | 11/1996 |
| WO | WO 01/29648 A2 | 4/2001 |

OTHER PUBLICATIONS

English Language Bibliography and Abstract of JP 8305507, Nov. 22, 1996, 1 page.

* cited by examiner

*Primary Examiner*—Twyler Lamb
*Assistant Examiner*—Yixing Qin
(74) *Attorney, Agent, or Firm*—Marger Johnson & McCollom, PC

(57) ABSTRACT

A method and apparatus for raster processing print data wherein multiple print-processing nodes process a print stream serially as it passes through those nodes. For instance, a client generates a print job with some pages in raster format and some pages in a Page Description Language (PDL) format, e.g., every other page. The pages are encapsulated with Printer Job Language commands that allow a printer to detect which pages in the mixed-format stream are in which format. The printer prints raster-format pages directly, and sends PDL-format pages to an internal renderer before submitting them to its marking engine. This arrangement allows printing, e.g., at full-marking-engine speed, on a printer with a low-speed renderer and from a client that can only render pages at low speed.

7 Claims, 11 Drawing Sheets

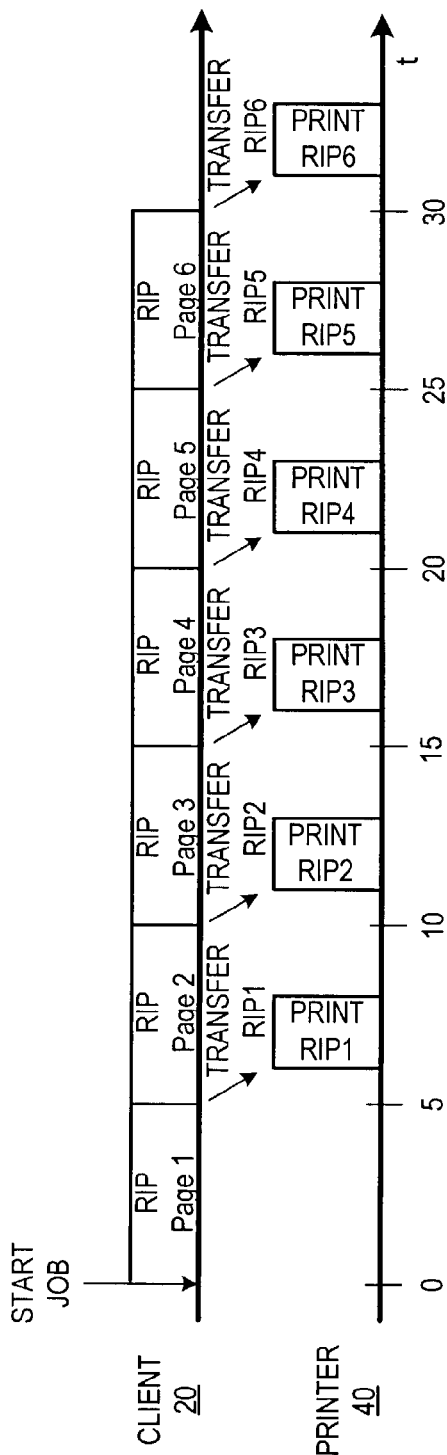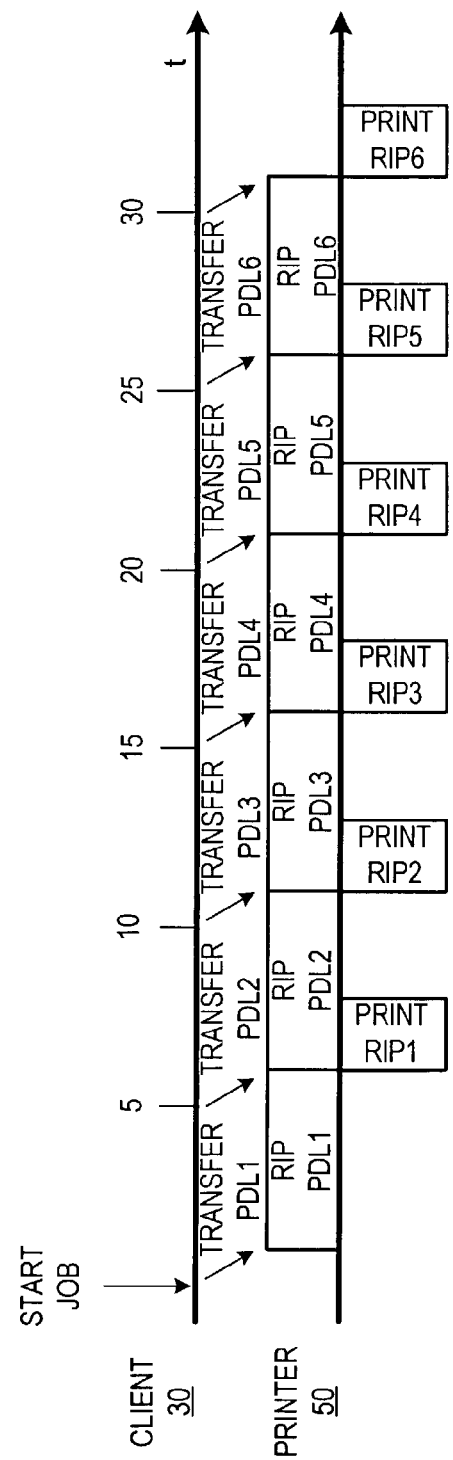

LOAD-BALANCING DISTRIBUTED RASTER IMAGE PROCESSING

FIELD OF THE INVENTION

The present invention relates generally to printing and printing system devices, and more particularly to systems and methods for sharing rasterization tasks among several print system devices.

BACKGROUND OF THE INVENTION

Document printing is a familiar task to just about anyone who has worked with a computer. Many computer users have had the experience (whether they recognized it or not) of requesting document printing and then having to wait while, somewhere in the print path, the document was rasterized (i.e., placed in the format required for the printer marking engine). For inkjet and other low-cost printers, the rasterization process is typically performed on the user's computer, and may cause a noticeable slowdown in computer response while rasterization is proceeding. For most other printers, the user's computer generates a Page Description Language (PDL)-format print file, such as a PostScript file. The printer interprets the PDL-formatted data and rasterizes it. In PDL-input devices, depending on page complexity and the relative speeds of the printer's onboard renderer and marking engine, a noticeable pause may be detected between when one page has finished printing and the next page is begun.

Several patents have been granted based on a parallel-print-processing approach, including U.S. Pat. No. 5,333,246 (the '246 patent), issued to Nagasaka on Jul. 26, 1994, and entitled "Page-Description Language Interpreter for a Parallel-Processing System", and U.S. Pat. No. 5,987,226 (the '226 patent), issued to Ishikawa et al. on Nov. 16, 1999, and entitled "Printing System and Method". These patents apply traditional parallel-computing concepts to print processing, in essence parsing out portions of a print job for parallel rasterization by multiple networked processors, collecting the rasterized portions returned from the parallel processors into a common raster file, and finally submitting the assembled raster file to the printer. Both the '246 and '226 patents deal with a variety of difficulties that must be addressed to make such a system work reliably: how to decide which parts of a print page can be rasterized separate from other parts of the print page, in order to segregate sections of PDL data that can be rasterized in parallel; detection of available processors and their capabilities; resource distribution to the distributed processors; inter-processor communication protocols; centralized print job management; and scheduling of print data communications between the processors.

Although parallel processing has many applications to which it is ideally suited, those applications (e.g., weather prediction, complex simulations) are generally orders of magnitude more complex than document printing. All of the issues that must be solved for parallel print processing are capable of solution. But for most network configurations it is questionable as to whether the increased print processing software size and complexity in all processing nodes, possibility of errors in partitioning and reassembly, and increased network traffic due to multiple back-and-forth print data transfers across the network are worth the speed benefit gained.

SUMMARY OF THE INVENTION

It is recognized herein that a different approach can achieve multi-processing efficiencies in print processing, without the complexities and inefficiencies that attend the prior-art parallel-print-processing approaches. The approach described in the embodiments herein is based on the observation that in most environments a print job naturally passes through multiple processing nodes before a marking engine finally transfers the contents of that print job to paper or other media. For instance, even with a single client hardwired to a printer, a print job originates on the client (which has a processor), and is then transferred to the printer (which, if capable of rasterization, has a separate processor). The rasterization load can be balanced between the client and printer by, e.g., having the client rasterize every other page in the print job and send the print job to the printer in a mixed format, with some pages in raster format and some pages in PDL format. The printer rasterizes the remaining pages as it receives them in the print job, and thus the rasterization load is halved on both devices. The client and the printer rasterize the print job in what can be viewed as a serial or pipeline approach, where each touches a part of the print job as it passes through. Once the "pipeline" is filled, the efficiency of this approach is in all likelihood much better than the efficiency of a parallel scatter-gather approach, and requires fewer processing and storage resources to accomplish.

Similar serial approaches can be used with a Raster Image Processing (RIP) Server that accepts print jobs from networked clients, rasterizes (or "RIPs") the print jobs, and then submits them to one of possibly several supported printers for printing. In one embodiment, the RIP server can accept a PDL print job, rasterize some pages of the print job, and then transfer a mixed raster/PDL format print job to the printer (which completes rasterization as described in the preceding example). In another embodiment, the client can rasterize some pages, transfer a mixed raster/PDL format print job to the RIP server, and then the RIP server completes rasterization and transfers a raster file to the printer. In a third embodiment, the client, RIP server, and printer could each process some pages of the print job. These embodiments can allow a less-powerful RIP server to run one or more printers at maximum marking speed by relying in part on client and/or printer processing resources to complete rasterization.

In simple embodiments, coordination between client and printer (and optionally a RIP server) is minimal. For instance, each of the serial devices could be assigned a fraction of the overall job, and that device would be responsible for processing a number of pages approximately equal to that fraction, preferably distributed approximately evenly throughout the print job. Except for the device that rasterizes the final set of PDL pages, each device could select the pages of its choosing for rasterization. Each non-printer device would be responsible for demarcating the sections that it had processed in a mixed-format print stream in such a way that a downstream device can detect portions of the print stream that have and have not already been rasterized.

In other embodiments, the devices can coordinate their loads with each other, and thus the question of which pages are processed by which device can remain more fluid. For instance, a RIP server that serves multiple printers may accept a larger proportion of a print job for rasterization when only one of its printers has a job pending than it accepts when it has jobs for multiple printers pending. A printer (or RIP server) could also communicate its rasterization progress or current loading upstream, so that an upstream processor can determine when to pass another PDL-format page to the printer.

BRIEF DESCRIPTION OF THE DRAWING

The invention may be best understood by reading the disclosure with reference to the drawing, wherein:

FIGS. 4, 5, and 6 show respective representative timing diagrams for the print configurations of FIGS. 1, 2, and 3;

DETAILED DESCRIPTION OF THE EMBODIMENTS

The advantages and operational differences of the embodiments are perhaps best understood by comparison to traditional print processing configurations. Accordingly, this description begins with a description of typical client, RIP server, and printer operation in a Microsoft Windows-type environment.

Figure 1:
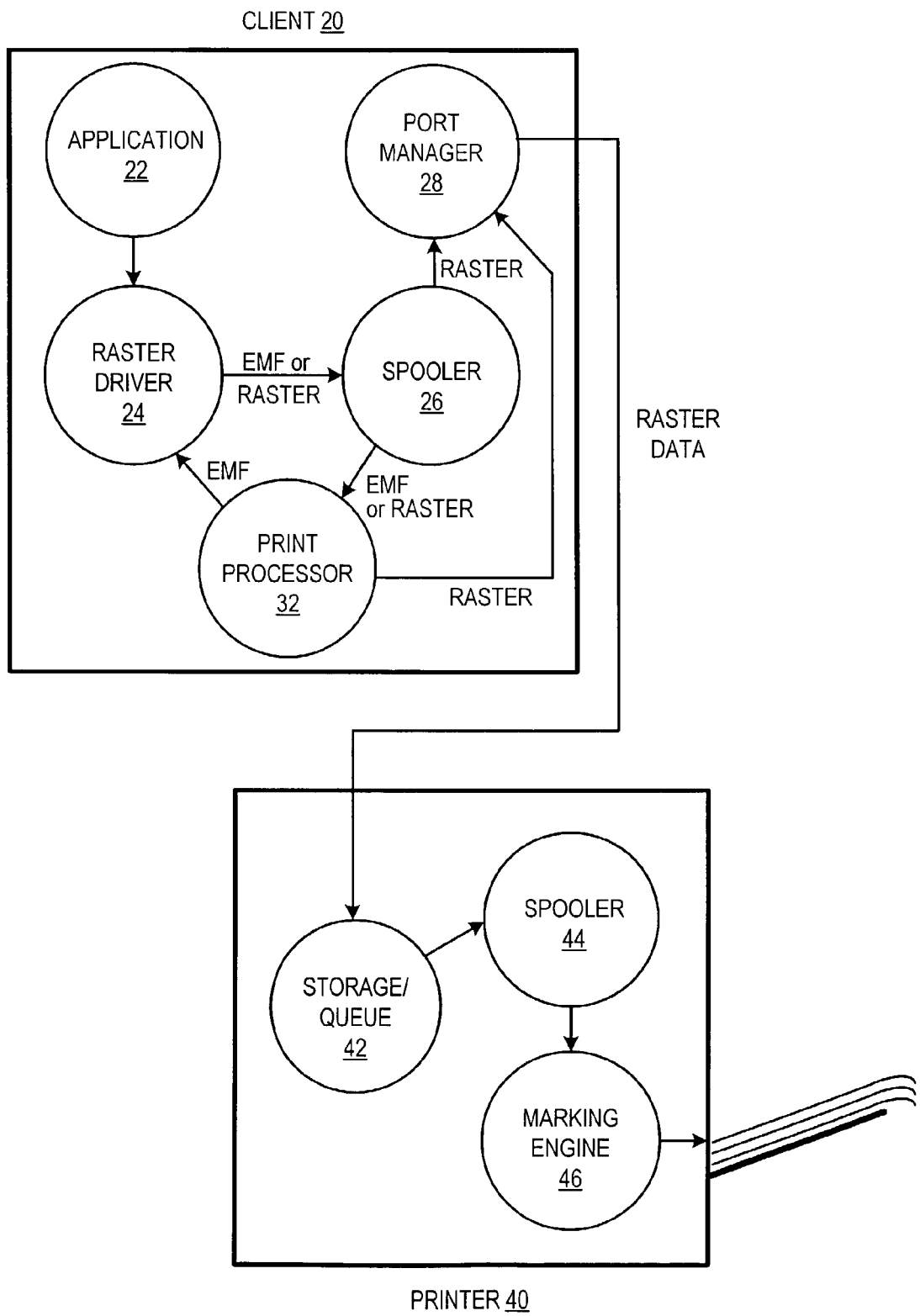
FIGS. 1, 2, and 3 show three prior-art print configurations.

FIG. 1 shows a client 20 and a basic printer 40. Client 20 runs applications, such as application 22, that generate graphical output as a set of instructions to a generic Windows-compatible display device.

When, e.g., a user or scheduled task prompts application 22 to print a document, application 22 passes the graphical instructions for printing the document to raster driver 24. Raster driver 24 is typically supplied by the manufacturer of printer 40, and is adapted to translate Windows-format graphical instructions to a printer-specific format. Driver 24 can either journal or render the instructions at this point to create a print job. When the data is rendered, driver 24 generates a raster print file and sends the raster file to spooler 26. When the data is journaled, driver 24 merely records the graphical instructions in an EMF (Extended Metafile) and sends the EMF data to spooler 26.

Spooler 26 acts as a print job queue, storing print jobs, generally in the order received, until printer 40 is ready to print those jobs. When a job reaches the head of the spooler queue, spooler 26 despools the job to print processor 32.

Print processor 32 is responsible for ensuring that a print job is in printer-ready format. When print processor 32 receives a print job in raster format, print processor 32 despools the raster data directly to the specific port manager 28 associated with printer 40. When print processor 32 receives a print job that is still in EMF format, print processor 32 plays back the printing instructions in the EMF to driver 24, which this time rasterizes the data and sends raster data to spooler 26. The spooler then despools the raster data to port manager 28, as in a Windows 98/Me environment, or despools the raster data to the print processor 32, which then despools the raster data to port manager 28, as in a Windows NT/2K/XP environment.

In yet other Microsoft Windows printing configurations, such as an NT/2K/XP client to an NT Print Server, the rendering of the EMF data is deferred to the NT Print Server. In this configuration, the print processor 32 on the client despools the EMF data to the port manager 28 associated with the NT print server. The spooler, print processor, and print driver on the NT Print Server then process the EMF data into raster data in a manner that follows that described above.

Port manager 28 is responsible for communicating with printer 40, e.g., using a parallel printer port, Universal Serial Bus (USB) or other serial port, or a network port for a networked printer. Port manager 28 feeds raster data to printer 40 as printer 40 is able to accept data.

Printer 40 is typical of an inkjet-type printer. Because printer 40 accepts only raster data, it requires no onboard firmware interpreter and renderer, and its cost is reduced. Printer 40 uses a storage/queue 42 to store received raster data (its total storage capacity may be less than a full page) for a print job. Spooler 44 despools raster data from storage/queue 42 to marking engine 46 at a time and rate that marking engine 46 can accept it.

Although the printer in this configuration can be inexpensive, the tradeoff is that the client must have sufficient processor, memory, and disk resources to render the print job in raster format. These resources may be substantial if the client is to drive printer 40 at its maximum marking speed, particularly if print processing is run as a background task to allow a user to continue to run applications while print processing is ongoing.

Figure 2:
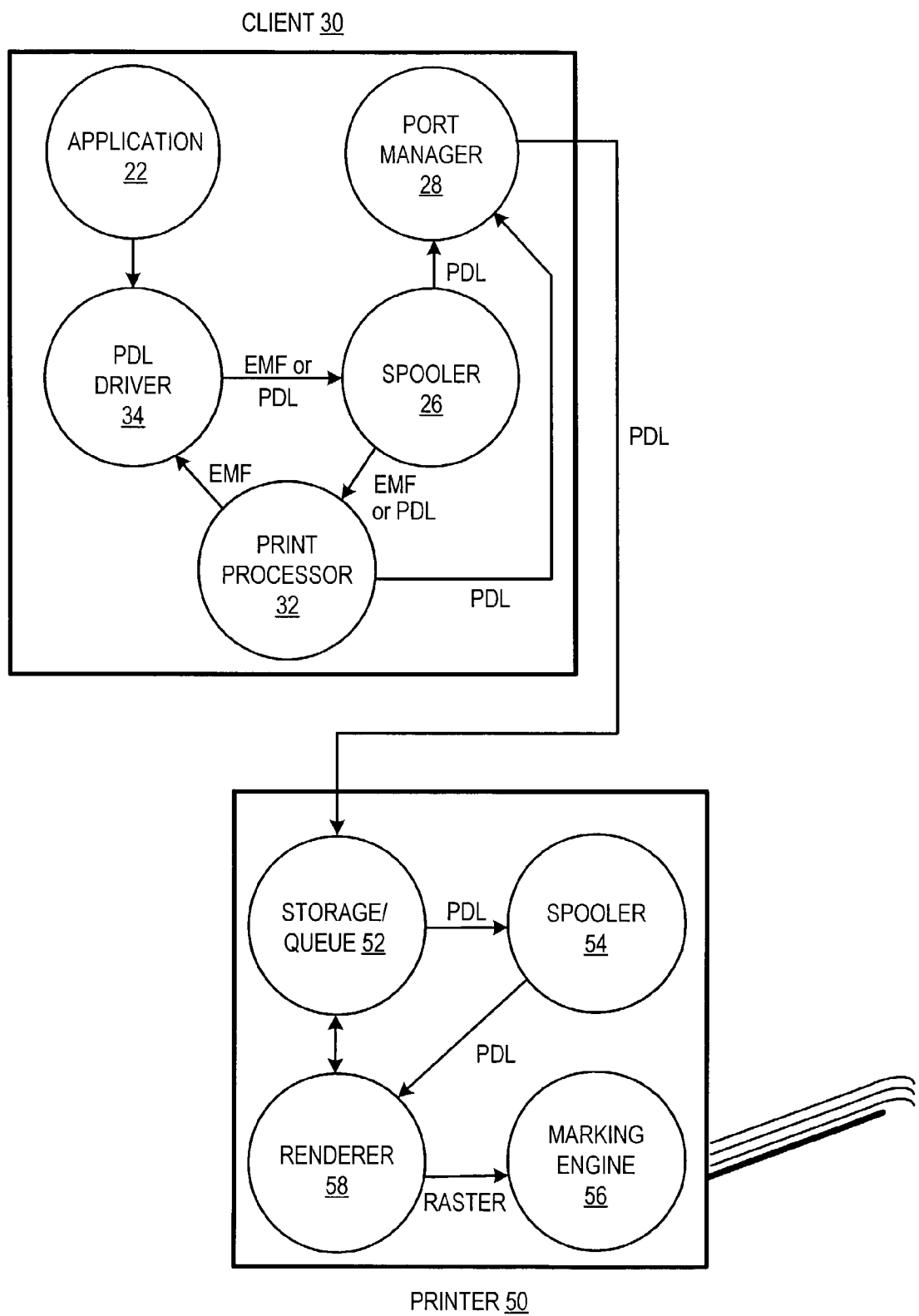

FIG. 2 illustrates a configuration similar to FIG. 1, but with a printer that can create raster data onboard. In this example, client 30 has the same general modules and functionality as client 20, but instead of a raster driver 24 it incorporates a PDL driver 34. In general, the computational and storage resources necessary to create a print job in a page description language such as PostScript are far less than those necessary to create a raster print job. Thus client 30 does not require the same level of performance as client 20 to get maximum performance out of its printer. In a shared-printing environment where the number of client devices outnumbers the number of printing devices, this can result in significant cost savings.

The disadvantage of the PDL approach is that printer 50 must be substantially more capable than printer 40. Spooler 54 generally includes a firmware interpreter to detect and respond to printer job language commands, e.g., by setting printer options and sending PDL data to renderer 58. Renderer 58 must be capable of translating PDL-format data to raster format. And storage/queue 52 not only stores PDL data, but it must also store resources (such as fonts) that the renderer needs, as well as at least one page worth of raster data that the renderer uses as a scratchpad to construct printable pages. In order to drive marking engine 56 at maximum marking speed, storage/queue 52 may need to store two or more pages of raster data, and the renderer may require an expensive processor to keep up with the marking engine under most circumstances.

Figure 3:
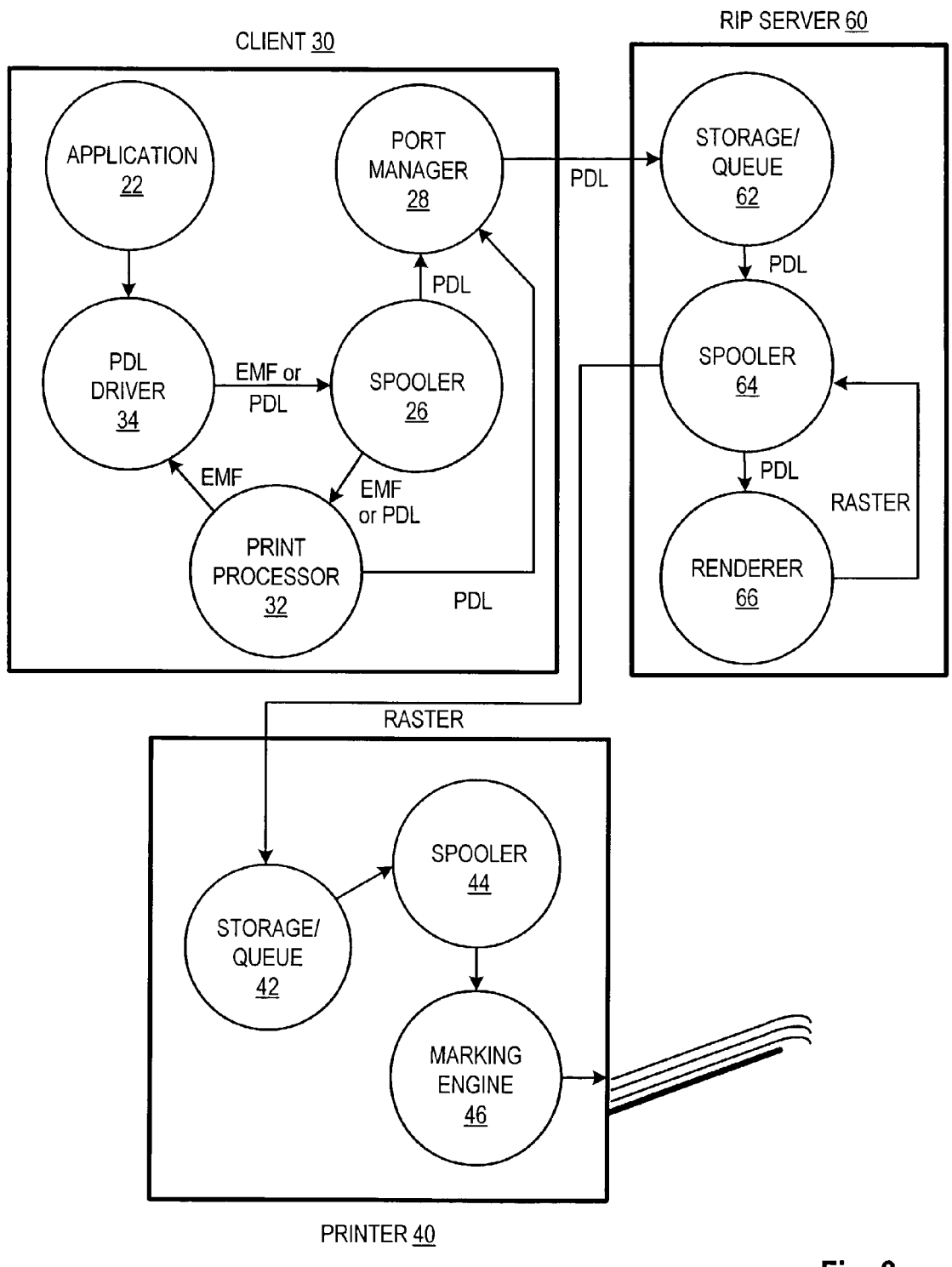

FIG. 3 illustrates another known configuration that employs a RIP server 60. This configuration uses the RIP server to absorb the print-processing load. A client 30 generates print jobs in PDL format, like in the example of FIG. 2. But instead of submitting the PDL print jobs directly to the printer, it submits them instead to RIP server 60. A printer 40 accepts print jobs in raster format, like in the example of FIG. 1. RIP server 60 performs PDL-to-raster conversion for the client print jobs. Thus this configuration concentrates the resources needed for rasterization in one device that is capable of offloading raster processing from a number of clients and printers. The disadvantage of this configuration is that an additional computer is required to be dedicated as a RIP server, and that computer may be expensive in order to RIP at full printer marking speed.

Figure 6:
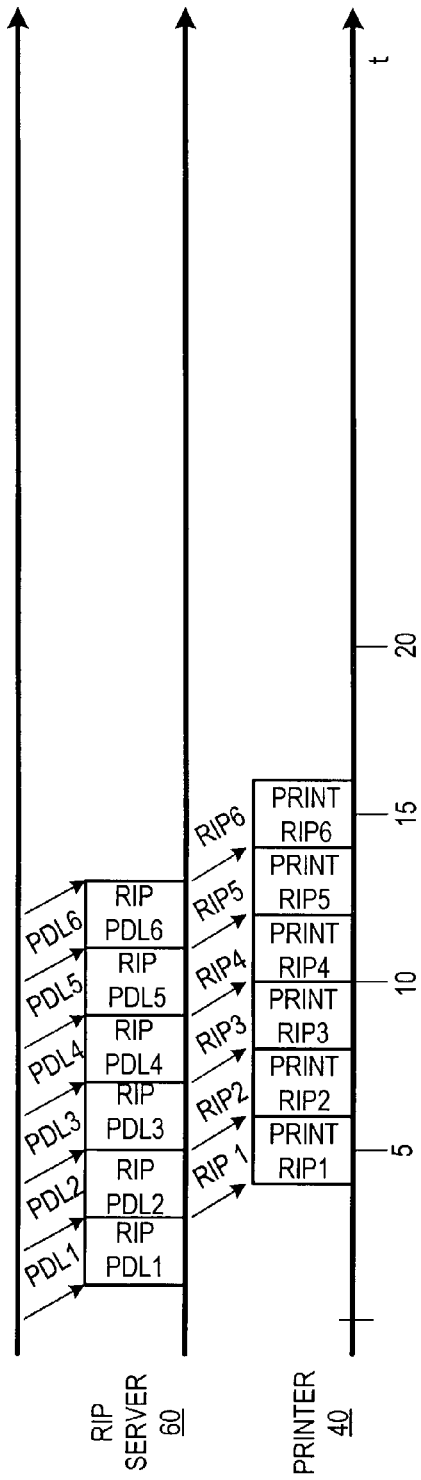

FIGS. 4, 5, and 6 illustrate the relative print performance for hypothetical clients, printers, and RIP servers as shown in FIGS. 1, 2, and 3, respectively. These examples assume, for a six-page print job, that the following timing is applicable:

one time unit to transfer a page from device to device;

two times units to process a print page through the printer marking engine;

two time units for a RIP server to translate a PDL page to raster format;

five time units for a client to translate a page to raster format; and five time units for a printer to translate a PDL page to raster format.

FIG. 4 shows representative timing for the configuration of FIG. 1 and the hypothetical six-page print job (those skilled in the art will recognize various approximations in the timing diagrams shown herein, which have been made deliberately in order to illustrate those timing concepts salient to the invention). Client 20 starts the job by spending five units of time rasterizing page 1 (additional time would be required if the job were journaled first). Client 20 then transfers raster page 1 (RIP1) to printer 40 and begins rasterizing page 2. Printer 40 completes printing RIP1 by t=8, and the waits until t=10 for client 20 to finish rasterizing page 2. This pattern continues for the remainder of the print job, with client 20 completing rasterization of page 6 at t=30 and printer 40 completing printing of page 6 at t=33. Of course, if client 20 were called upon to perform some other process during this time period, the entire print process would be delayed accordingly—and perhaps significantly if raster driver page memory had to be swapped out to disk. What is most illustrative, however, is that printer 40 is tied up for 28 time units—and client 20 is loaded for 30 time units—to print a print job that only requires 12 time units of marking time. This timeline can be shrunk significantly if raster processing is speeded up.

FIG. 5 shows a similar timing diagram for the configuration of FIG. 2 and the hypothetical six-page print job. Client 30 translates the print instructions for page 1 to a PDL-format page PDL1 (in a relatively small period of time) and transfers PDL1 to printer 50 by time t=1. Printer 50 spends until time t=6 rasterizing PDL1 to produce RIP1, which it then prints from t=6 to t=8. Assuming that the marking engine can print RIP1 while PDL2 is rasterized, the renderer begins working on PDL2 as it begins printing RIP1. This pattern continues for the remainder of the print job, with printer 50 completing rasterization of page 6 at t=31 and printing of page 6 at t=33. Although the time to print has not been decreased over the first example and the marking engine is still idled during much of the print job, the client in this example is at least not delayed. Other clients competing for printer 50 will, however, have to wait longer for the print job to complete.

FIG. 6 illustrates how a RIP server speeds up the print process. FIG. 6 assumes that the RIP server has sufficient processing and memory resources to RIP each page in the same time that the printer marking engine requires to print a page. A one-time-unit delay is incurred for the transfer of a PDL-format page between client 30 and RIP server 60. RIP server 60 rasterizes PDL1 in two time units, and then an additional one-time-unit delay is incurred for the transfer of RIP1 to printer 40. Printer 40 can immediately mark page 1, and page 1 is printed by t=6. As RIP server 60 can then keep pace with printer 40, the marking engine runs continually from t=4 to t=16, at which point the print job is complete. The client 30 was not loaded by the print job, and the printer operated with high efficiency, requiring only 13 time units to process the six-page job. The process would be slowed, however, were RIP server 60 not so powerful, or required to divide its attention between this job and another print job on another printer it serves.

What can now be seen from FIGS. 4, 5, and 6 is that additional processing resources are potentially available within the devices already involved in the print process, to help speed the process if needed—but only if print processing could be configured in a different way. For instance, in FIGS. 5 and 6, it is likely that the client could devote some resources to print processing. Likewise, in FIGS. 4 and 6, a printer that had some rendering capability could contribute to RIP, even if it was unable to perform a RIP of every page and run its own marking engine at full speed. But the conventional print configurations cannot tap these capabilities. The following embodiments can.

The constraints on traditional print processing are generally imposed by the format of the print job: at each step of the way, the print job is entirely in one format. Even in the prior art parallel-processing scatter-gather approaches, each scattered piece is in PDL format and each gathered piece is in raster format. By removing this one-format limitation, it becomes possible to serial process a print job by having different processors operate on different parts of the print job, thus distributing the print-processing burden without the complications that attend true parallel processing—and with potentially little modification to existing device functionality.

Figure 7:
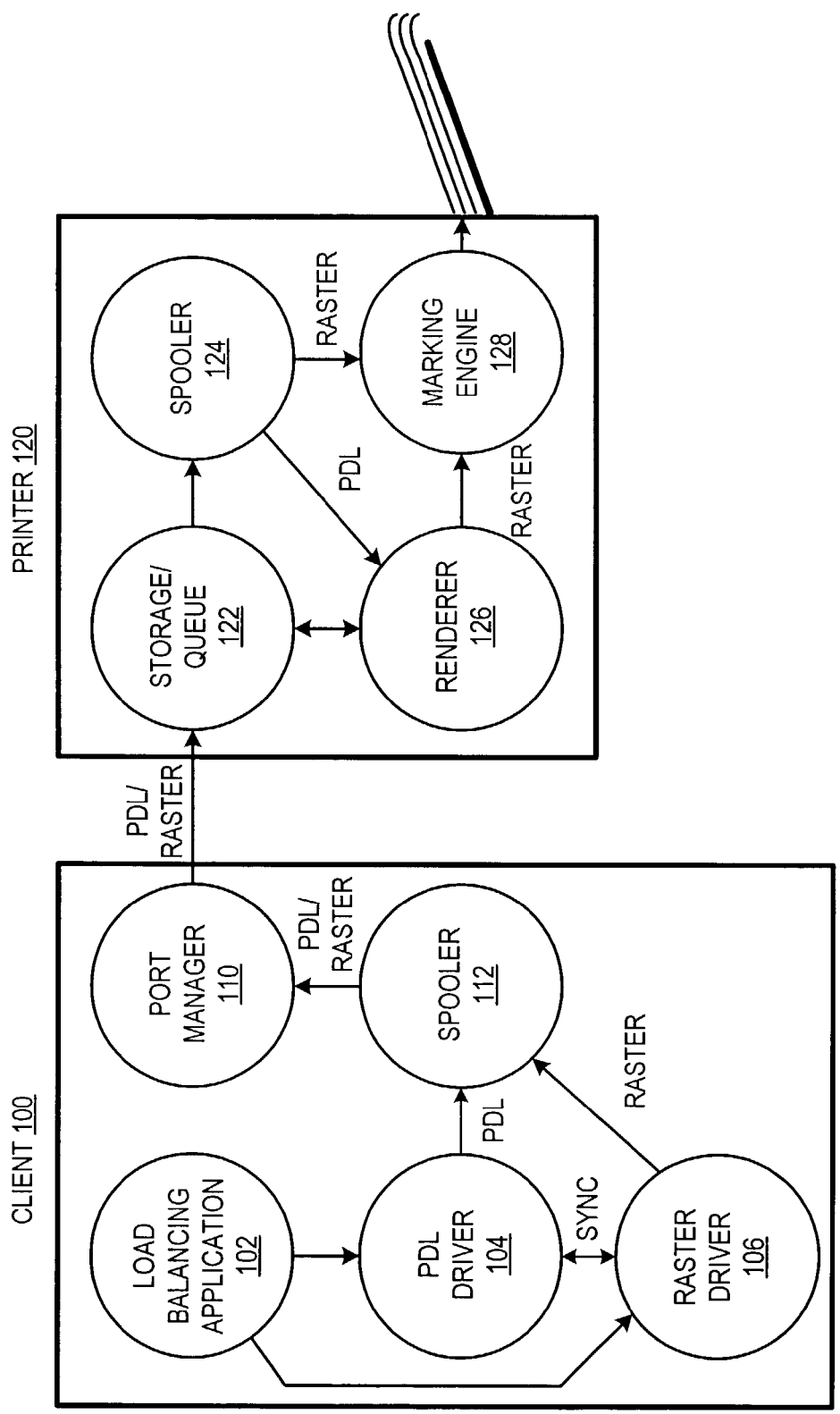
FIG. 7 shows a load balancing client/printer configuration according to one set of embodiments described herein.

FIG. 7 illustrates a first configuration according to an embodiment of the invention. A client 100 is modified so that it can generate mixed-format PDL/raster print jobs, and a printer 120 is modified so that it can parse and complete rasterization for mixed-format PDL/raster print jobs. Client 100 and printer 120 will each be described in turn.

Client 100 contains a load-balancing application 102, i.e., an application that can be configured to apportion RIP duties between the client's own driver and a downstream renderer. The application may be an actual user application, such as a word processor, drawing program, or imaging package, or an operating-system-resident application that intercepts calls to a driver for the printer of interest.

Load-balancing application 102 has the capability to apportion a print job between two print driver modules (a PDL driver module 104 and a raster driver module 106) associated with printer 120. PDL driver module 104 renders printing instructions into PDL data. Raster driver module 106 renders printing instructions into raster data. The two drivers include some inter-driver synchronization, as will be explained shortly. And although shown logically separate, modules 104 and 106 could also be a single driver having two render modes and an internal switching mechanism. Note that a two-printer-driver module configuration does not limit the ability of the system to delay rendering using journaling. One, or both, printer driver modules can save printing instructions as EMF data, which can then be played back to the respective printer driver modules (e.g., see the analogous configuration shown in FIG. 9).

Application 102 partitions the print data by physical sheet boundaries, sending the printing instructions for some sheets to PDL driver module 104 and the printing instructions for the remaining sheets to raster driver module 106. Although more complex page distribution strategies will be discussed, for this first embodiment application 102 simply distributes pages in round-robin fashion between drivers 104 and 106.

For operation with a conventional spooler 112, drivers 104 and 106 make their combined output appear as a single print stream to spooler 112. For instance, one driver can be designated as the controlling driver, which initiates the job start command sequence and terminates the job with an end job command sequence. This driver shares the spooler job input stream with the other driver.

To prevent inadvertent interlacing of data in the print stream, some synchronization must be used to ensure that only one driver is spooling print data at a time. This can be accomplished by having each driver not return control back to the application until it has fully spooled its current sheet. Or, as shown, synchronization messaging between the two drivers can pass a token back and forth, allowing the drivers to free the application once the application has indicated to the drivers which pages each is responsible for.

In this embodiment, a printer job control language (PJL) is used to allow PDL and raster data to be mixed in the print stream. For instance, the following job composition could be used to delineate a six-page print job formed by drivers 104 and 106 in round-robin fashion:

| | |
|---|---|
| UEL | //Universal Exit Language |
| @PJL RESET | //Printer Reset |
| @PJL SET DUPLEX | //First Print Job Directive |
| ... | |
| @PJL SET COLLATION | //Last Print Job Directive |
| @PJL ENTER LANGUAGE=PS | //Begin Postscript data interp. |
| <PS data, page 1> | |
| @PJL ENTER LANGUAGE=RIP | //Begin Raster data spooling |
| <Raster data, page 2> | |
| @PJL EXIT LANGUAGE=RIP,<tag> | //End Raster Data |
| @PJL ENTER LANGUAGE=PS | //Begin PostScript data interp. |
| <PS data, page 3> | |
| @PJL ENTER LANGUAGE=RIP | //Begin Raster data spooling |
| <Raster data, page 4> | |
| @PJL EXIT LANGUAGE=RIP,<tag> | //End Raster Data |
| @PJL ENTER LANGUAGE=PS | //Begin PostScript data interp. |
| <PS data, page 5> | |
| @PJL ENTER LANGUAGE=RIP | //Begin Raster data spooling |
| <Raster data, page 6> | |
| @PJL EXIT LANGUAGE=RIP,<tag> | //End Raster Data |
| @PJL RESET | //Printer Reset |
| UEL | //Universal Exit Language |

The @PJL ENTER LANGUAGE=[PS, RIP] command is used to instruct the printer as to what format the following data will appear in. PostScript contains its own end-page commands, which can be used to return control to the PJL interpreter. Following the raster data for a page, a @PJL EXIT LANGUAGE=RIP, <tag> command instructs the printer to return to job language interpretation. The tag is optional, but if somehow tied to the file (time stamp, number of bytes contained in the raster data segment, etc.), the possibility that the appearance of an @PJL EXIT in the data itself will ruin the format demarcation is lessened. Optionally, a tag with the number of bytes that follow in raster format can be attached to the @PJL ENTER LANGUAGE command. Or, the random occurrence of an @PJL command within the data could be escaped.

In the example above, driver 104 generates everything preceding the first @PJL ENTER LANGUAGE=RIP command, and everything after the last @PJL EXIT LANGUAGE=RIP command. Between these job sections, driver 104 is responsible for all Postscript job sections and driver 106 is responsible for all raster job sections. Driver 104 can also add the PJL tags between pages, or optionally each driver can be responsible for the tags encapsulating the pages it generates.

It can be appreciated that the example print job above required no coordination with other processing devices before it could be generated. As will now be illustrated, printer 120 can read and print this job with no new upstream coordination as well.

Printer 120 contains storage/queue 122, spooler 124 (having an internal PJL interpreter), renderer 126, and marking engine 128. Mixed PDL/raster print jobs arrive at storage/queue 122. Spooler 124 despools the print job, and uses a PJL interpreter to detect sheet boundaries and print data type for each sheet. Sheets that contain raster data are sent directly to marking engine 128. Sheets that contain PDL data are sent to renderer 126. Renderer 126 interprets the PDL data to form a raster page, which renderer 126 then sends directly to the marking engine (or optionally, back through the spooler).

Preferably, the transfer of raster data to the marking engine can occur at the same time that the renderer is creating another raster page. This allows a received raster page to be printed while the renderer works on a PDL page. In any event, spooler 124 coordinates the transfer of raster data to marking engine 128 so that only one page is supplied to marking engine 128 at a time, and in the correct order.

Figure 8:
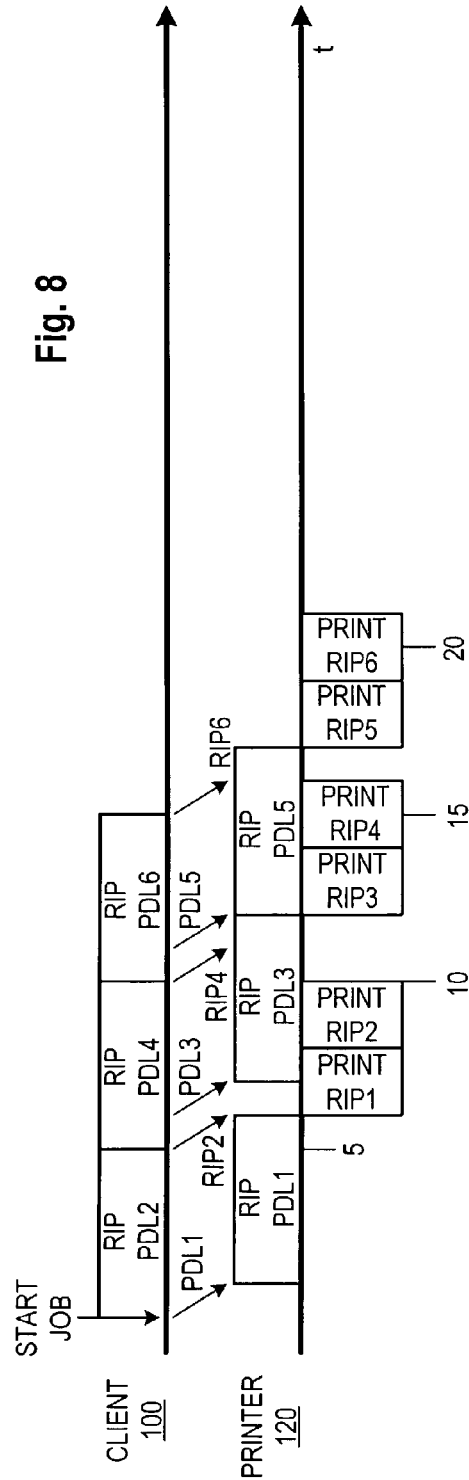
FIG. 8 shows a representative timing diagram for the configuration of FIG. 7.

FIG. 8 shows an exemplary timing diagram for the embodiment of FIG. 7 and the six-page print job example used to create FIGS. 4-6. FIG. 8 assumes that client 100 is no faster at rasterizing a page than client 20 (five time units/page), and that printer 120 is no faster at rasterizing a page than printer 50 (also five time units/page).

In FIG. 8, when the job starts client 100 converts printing instructions for page 1 to a PDL page PDL1, and begins the transfer of this page to printer 120. Client 100 then begins converting printing instructions for page 2 to raster format, which takes five time units. Meanwhile, printer 120 has received PDL1. Spooler 124 has detected that the first page of the print job is in PDL format, and by t=1 has passed PDL1 to renderer 126 for RIP.

At t=5, raster driver 106 has completed RIP of page 2, and thus port manager 110 transfers RIP2 to printer 120 between t=5 and t=6. And raster driver 106 is now working on page 4, having begun that page upon completing RIP2 at t=5.

At t=6, renderer 126 completes RIP on PDL1, and transfers RIP1 to marking engine 128 for output between t=6 and t=8. On the client side, PDL driver 104 submits PDL3 to port manager 110 for transfer to printer 120 between t=6 and t=7. Meanwhile, spooler 124 has received RIP2 and is prepared to despool RIP2 to marking engine 128 as soon as marking engine 128 completes page 1.

At t=7, spooler 128 has received PDL3 and has despooled it to renderer 126. Renderer 126 begins RIP on PDL3 at t=7, and will complete at t=12.

At t=8, marking engine begins printing RIP2, and finishes at t=10. Also at t=10, on the client side, raster driver 106 completes RIP on page 4 and begins RIP on page 6. Port manager 110 transfers RIP4 to printer 120 between t=10 and t=11, and transfers PDL5 to printer 120 between t=11 and t=12.

At t=12, renderer 126 completes RIP on page 3 and begins RIP on page 5. RIP3 is printed by marking engine between t=12 and t=14, followed by RIP4 (which is waiting to be despooled by this point) between t=14 and t=16.

At t=15, on the client side, raster driver 106 completes RIP on page 6. Between t=15 and t=16, RIP6 and the end command sequence are transmitted to printer 120.

At t=17, renderer 126 completes RIP on page 5. RIP5 is printed by marking engine between t=17 and t=19, followed by RIP6 (which is waiting to be despooled by this point) between t=19 and t=21.

Several observations can be made from this example. First, and perhaps most evident, using the prior art configurations of FIGS. 1 and 2 the entire print job took 57% longer than in this example. And the RIP server configuration of FIG. 3, with the fastest possible execution, only enjoys a 24% speed advantage over the load-balanced operation of FIG. 7, which operates with only a much slower client and a much slower printer. Also quite evident is the halving of the processing load on each of the client and printer, compared to one of them being tasked with rasterizing the entire print job.

Another observation is that the operation of drivers 104 and 106 is quite independent of the operation of printer spooler 124 and renderer 126. Thus even if the print job was delayed at port manager 110 due to other traffic from other clients, or delayed at a print server due to other jobs queued for the printer, it would still execute efficiently when it reached the printer and produce significant time savings, without a requirement that the client process all pages or that the printer possess a speedy renderer.

Figure 9:
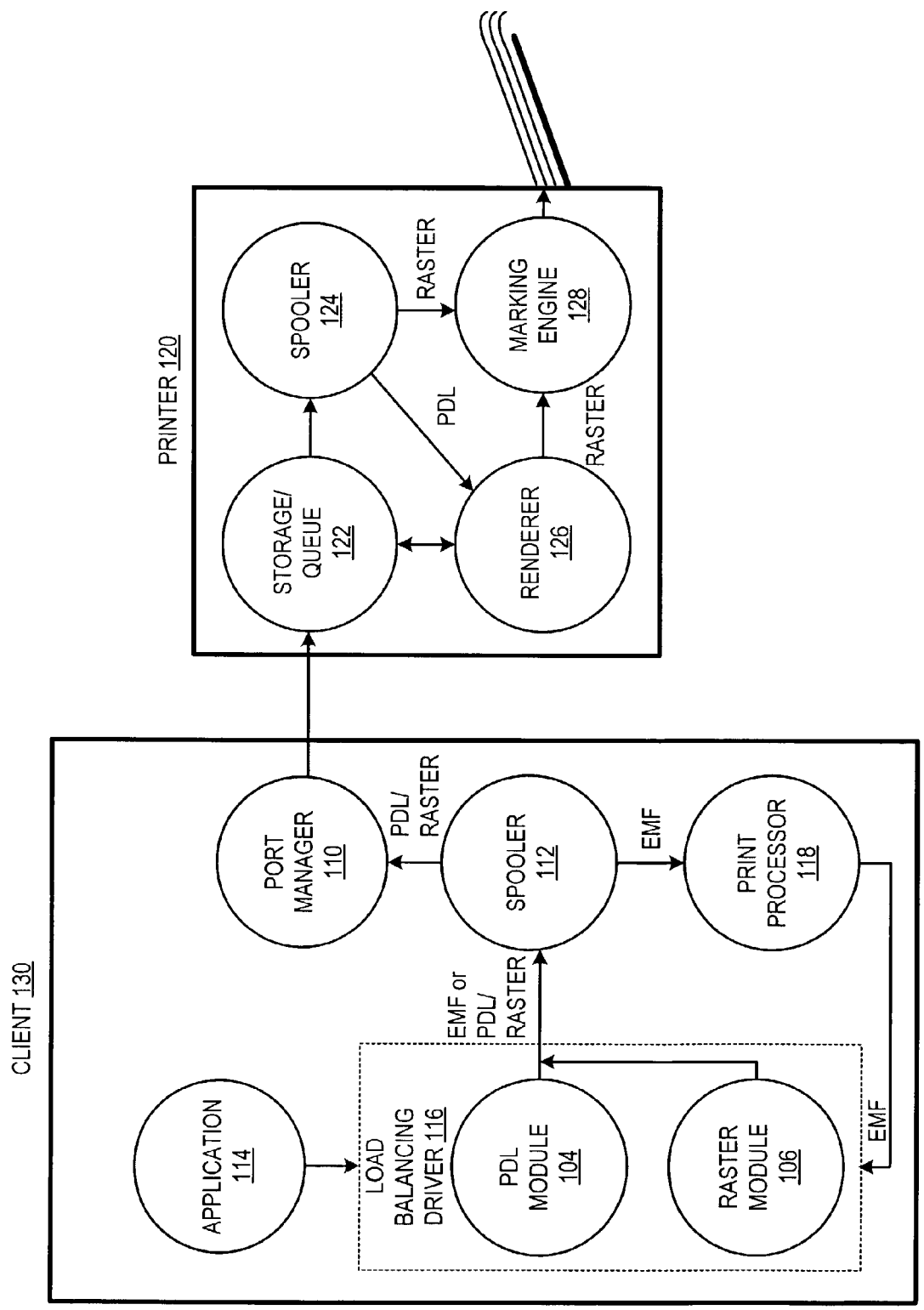
FIGS. 9 and 10 illustrate alternate client embodiments according to embodiments described herein.
Figure 10:
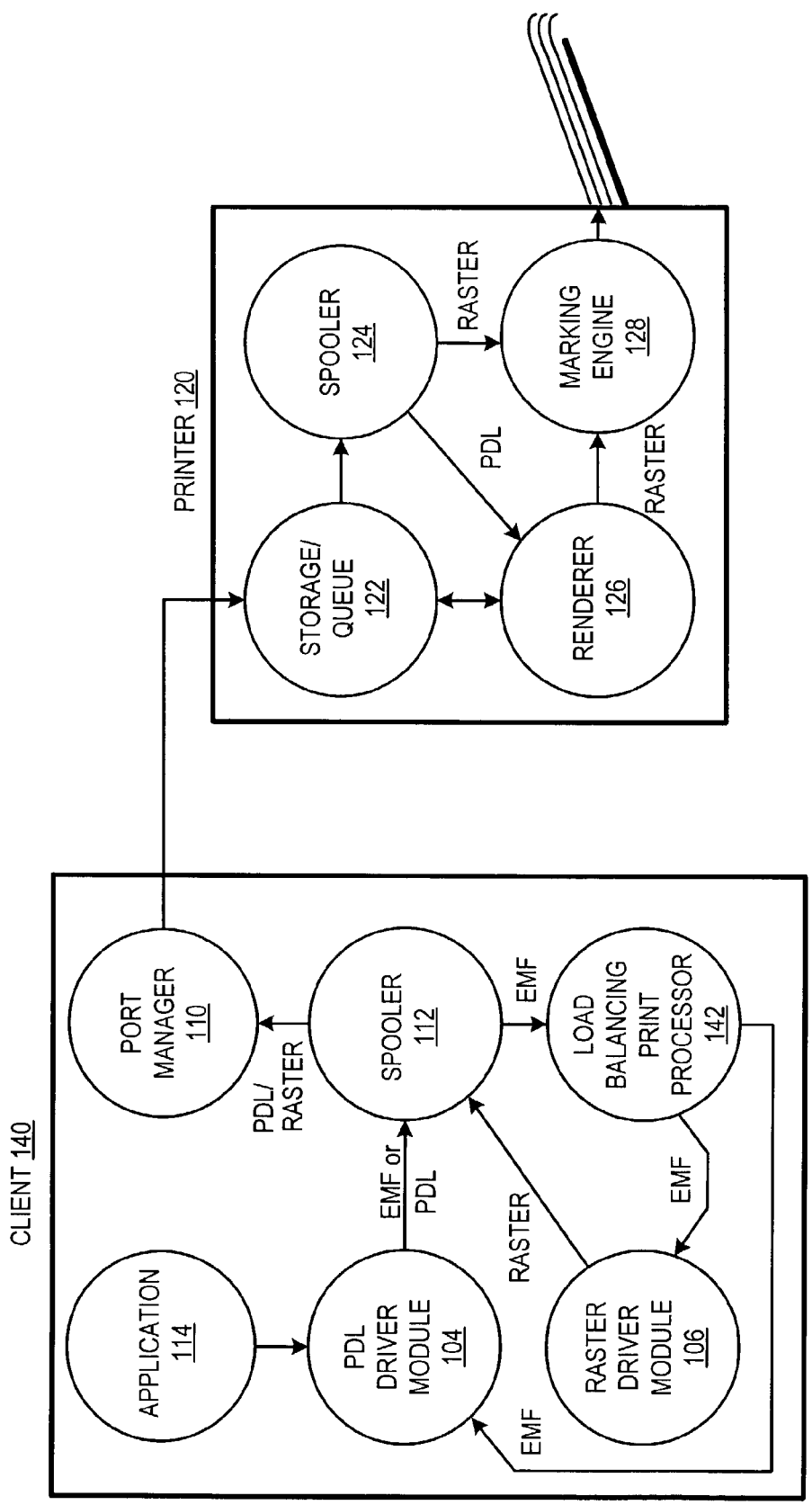

FIGS. 9 and 10 illustrate alternate client embodiments. In FIG. 9, instead of a load-balancing application, a load-balancing print driver 116 is used. Application 114 submits print instructions to driver 116 just as it would any other device driver. Within driver 116, a PDL module 104 and a raster module 106 are available to render pages.

Driver 116 appears to application 114 and print processor 118 as any other driver. Driver 116 can even journal print data as an EMF, which print processor 118 plays back to driver 116 for delayed rendering.

When actually rendering print data, driver 116 distributes some pages to PDL driver module 104 and some pages to raster driver module 106, and merges their output (with PJL commands as described in the preceding embodiment) before sending the print stream to spooler 112. The spooler then despools the mixed-format rendered data to port manager 110, which transfers the print data to printer 120 for processing, e.g., as described earlier with regard to FIG. 7.

FIG. 10 uses two driver modules similar to those shown in FIG. 7. But instead of a load-balancing application that distributes pages between the two driver modules, a load-balancing print processor 142 is employed. Application 114 submits print instructions to one driver module, e.g., module 104, which journals them as an EMF. When print processor 142 plays back the EMF data, it distributes some pages to PDL driver module 104 and the remainder of the pages to raster driver module 106. Output from the modules is synchronized, e.g., using one of the methods described in the first embodiment, such that the print stream appears in the proper order at the spooler. One of the modules (or both modules in cooperation) generates PJL commands for the print job.

In yet another configuration (not shown) that includes, e.g., a Microsoft Windows NT Print Server, the journaled print data (EMF) can be entirely despooled to the NT Print Server, with PDL driver 104, raster driver 106, and load-balancing print processor 142 located on the NT Print Server. The NT Print Server performs the load-balancing rendering functions described above.

In a related configuration, both the client 140 and an NT Print Server (not shown) could incorporate load-balancing print processors and mixed-format rendering drivers as described above. In such a configuration, playback of EMF data can be divided between the client and the server print processors to their respective rendering drivers. Note that the print stream distributed to the NT Print Processor in such an instance would be a mixed EMF/render stream.

Although the preceding embodiments distribute RIP duties between a client and a printer, the concepts discussed readily extend to a print environment that uses a RIP server. A configuration that allows RIP duties to be shared by a client, a RIP server, and a printer is shown and described below. From this discussion, it is evident that load balancing can be shared just between client and RIP server (with the printer received a printer ready print stream), or just between RIP server and printer (with the client generating a PDL print stream). These simpler embodiments are therefore not addressed in detail.

Figure 11:
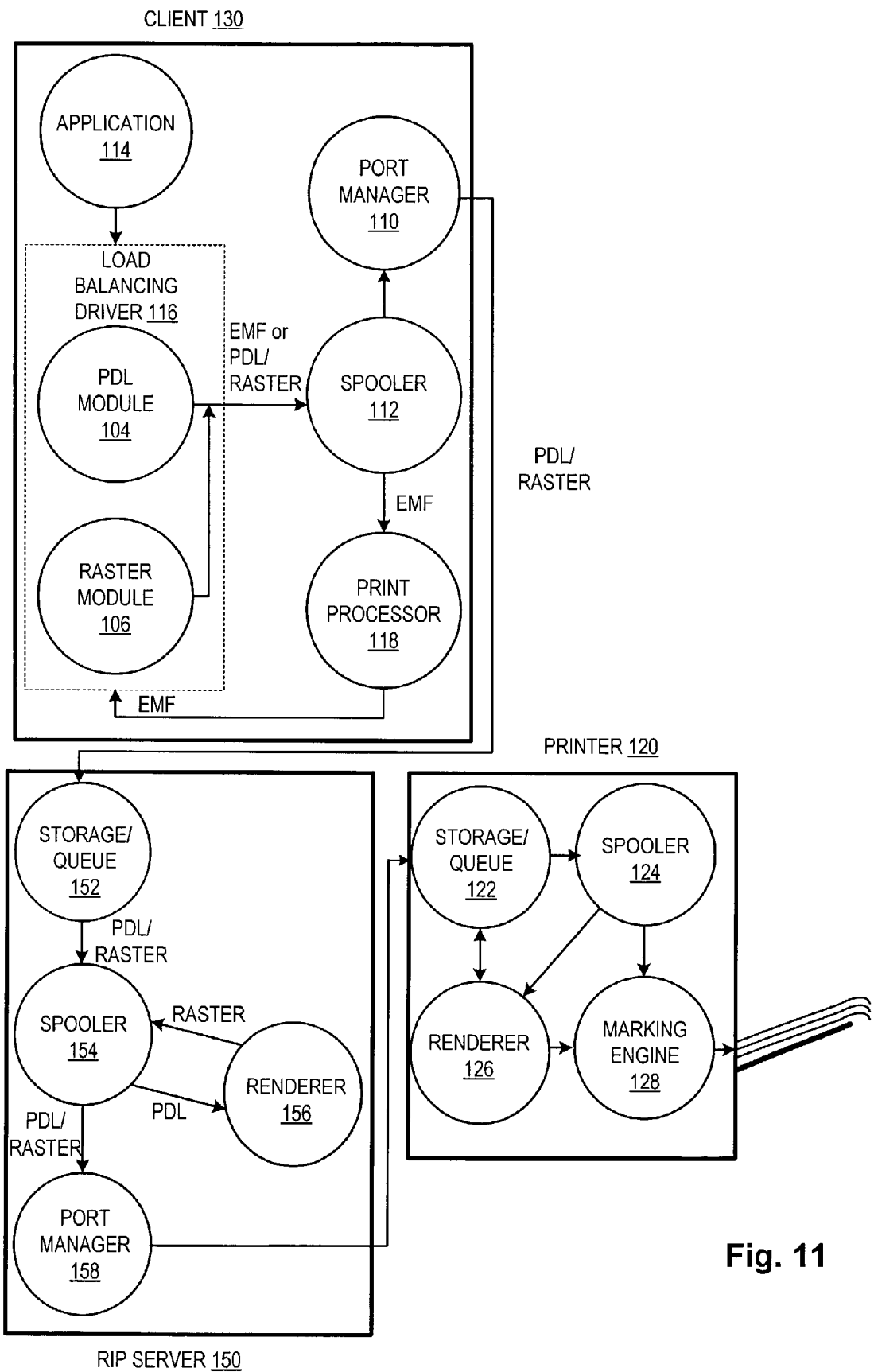
FIG. 11 depicts a print configuration with a load-balancing RIP server according to embodiments described herein.

FIG. 11 shows a print configuration with a RIP server 150 inserted between client 130 and printer 120 of FIG. 9. Unlike a traditional RIP server, RIP server 150 can accept, process, and produce mixed PDL/raster print streams. Either spooler 154 or renderer 156 (or a separate control module, not shown) has the capability to parse a mixed PDL/raster print stream and detect which pages have not yet been rasterized. Renderer 156 rasterizes some (or all) of the pages that arrive at the RIP server in PDL format, and places them back in the print stream in raster format. Note that if the altered pages have PJL encapsulation that identifies them as PDL-format, RIP server 150 must modify the PJL encapsulation for that page when it translates a page to raster format.

In prior-art RIP servers, such devices generally have the ability to RIP pages at the maximum marking speed of a printer they serve (e.g., a RIP speed of two time units per page in FIG. 6). With the load-balanced embodiment of FIG. 11, a server as powerful as illustrated in FIG. 6 but with mixed-print-stream capability can load share to run more printers simultaneously. Alternately, print performance comparable to FIG. 6 can be obtained using a slower, less-expensive server that can process mixed print streams. The following timing example illustrates such a usage.

Figure 12:
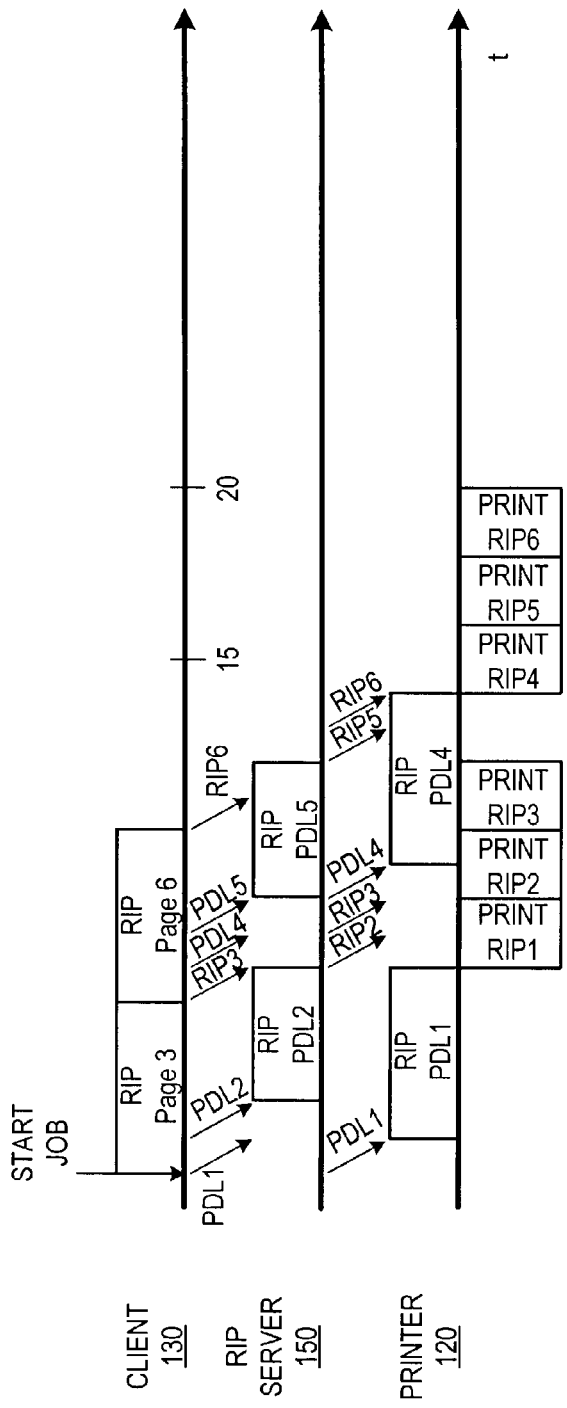
FIG. 12 shows a representative timing diagram for the configuration of FIG. 11.

Assuming that RIP server 150 takes twice as long as RIP server 60 to RIP one page (four time units vs. two), FIG. 12 shows a timing example for the six-page print job example and the configuration of FIG. 11. FIG. 12 illustrates that after filling a print-processing pipeline, the FIG. 11 embodiment can operate as quickly as the FIG. 3 embodiment.

At t=0, client 130 begins by transferring the first two pages to RIP server 150 as PDL pages (PDL1 and PDL2). Client 130 also begins rasterization of page 3.

At RIP server 150, PDL1 is passed through to printer 120 so that printer 120 can begin RIP on the first page. RIP server 150 begins RIP on PDL2 at t=2.

Client 130 is the first to complete RIP on a page, at t=5. At that time it transfers RIP3 to RIP server 150 and begins RIP on page 6. Note that as soon as it completes transfer of RIP3, client 130 also transfers PDL4 and PDL5 to RIP server 150.

At t=6, both RIP server 150 and printer 120 complete RIP on their respective first pages. Printer 120 begins printing RIP1, and begins receiving RIP2 from RIP server 150.

Following RIP2, RIP server 150 transfers RIP3 and PDL4 to printer 120. Thus the marking engine has enough data to print pages one to three without stopping, and begins RIP on PDL4 at t=9. Meanwhile, RIP server 150 has begun RIP on PDL5 at t=8.

Following the printing of page 3, printer 120 idles the marking engine for two time periods while it completes RIP of PDL4. Note that if the job were longer than six pages, the pipeline could enter a steady-state operation, for the additional pages, that did not idle the marking engine (the combined RIP throughput of the client, RIP server, and printer is 13/20 pages per time unit, whereas the marking engine throughput is only ½ page per time unit).

Client 130 and RIP server 150 complete RIP on their respective last pages before printer 120 completes its last page, and can go on to other tasks. At t=14, printer 120 completes RIP of PDL4, and prints the last three pages with no further idling of the printing engine.

Although this example completed no faster than FIG. 8, where no RIP server was present, this is due to the delays in filling a deeper print-processing pipeline. Were the print job longer, the operation depicted in FIG. 12 would begin to outperform the operation shown in FIG. 8, and would match (except for the initial delay) the performance of FIG. 6, which required three times the RIP capacity for its RIP server.

In yet another configuration, the RIP server could actually be a Microsoft Windows NT Print Server. Were an NT Print Server configured to include the functionality of RIP server 150 and the capability to render in a mixed PDL/raster format, client 130 could send EMF data to RIP server 150 for each page that will not be rasterized by client 130. Of course, a series of cascading RIP servers can perform these functions, where each RIP server can rasterize a subset of the PDL format pages.

Several observations can now be made based on FIG. 12. First, there is almost enough RIP throughput in the printer and RIP server to keep a marking engine busy without any RIP on the client at all (9/20 pages of RIP per time unit vs. ½ pages of marking engine throughput per time unit). It is perhaps more preferable to divide RIP so that the printer's renderer is kept continuously busy (since that is its only job), the RIP server is kept busy to the extent that it has nothing else to do (since that is its only job), and the client is only called on to RIP a page every now and then to take up the little remaining slack. For this approach, a simple round-robin approach will not work.

A weighted round-robin approach can be used if client 130 is informed of what weight to apply to each other processing node. For instance, in the example above, if client 130 knew that, in fact, RIP server 150 can handle 50% of the required RIP rate and printer 120 can handle 40%, client 100 can send nine of every ten pages to RIP server 150 in PDL format, and only RIP every tenth page. RIP server 150, armed with the same information, can expect to process five of every nine PDL pages it receives and pass the other four to printer 120.

Figure 13:
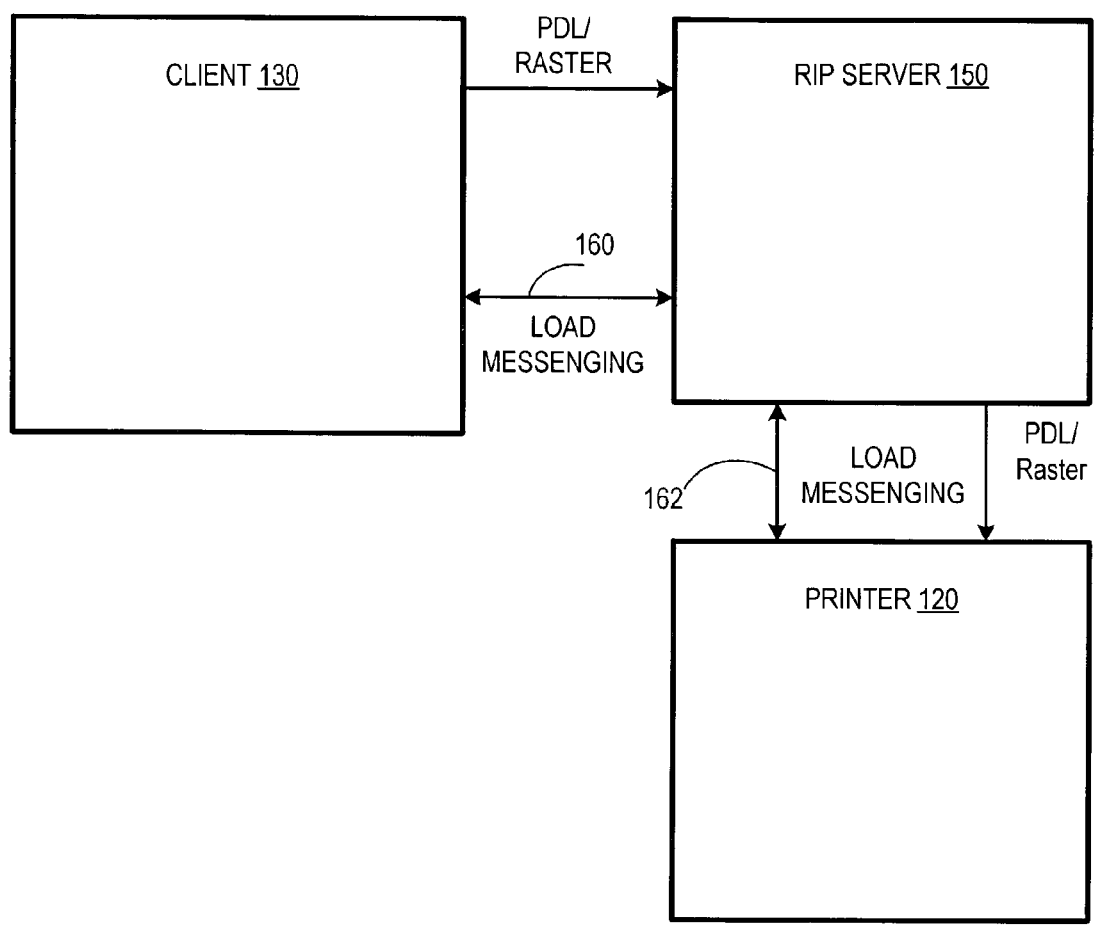
FIG. 13 shows some possible messaging paths for serial print processing nodes that share load information.

As a second observation, this situation can be improved by adding some sort of communication between the processing nodes. FIG. 13 shows, in block diagram form, client 130, RIP server 150, and printer 120. Client 130 and RIP server 150 communicate load messaging over a first connection 160, e.g., a Simple Network Management Protocol connection. RIP server 150 also receives load messaging from printer 120 over a second such connection 162. Printer 120 could also communicate load messaging to client 130 (not shown).

Using such connections, the client and/or RIP server can discover the RIP progress of printer 120 on its current page in order to predict when to send another PDL page to the printer. The client can make similar scheduling decisions based on information from the RIP server, or the RIP server can request more PDL pages as it is able to handle them. Further, if the loading on the RIP server changes, the client can respond to this condition and dynamically change its RIP load share to keep the print process proceeding at high speed.

Figure 14:
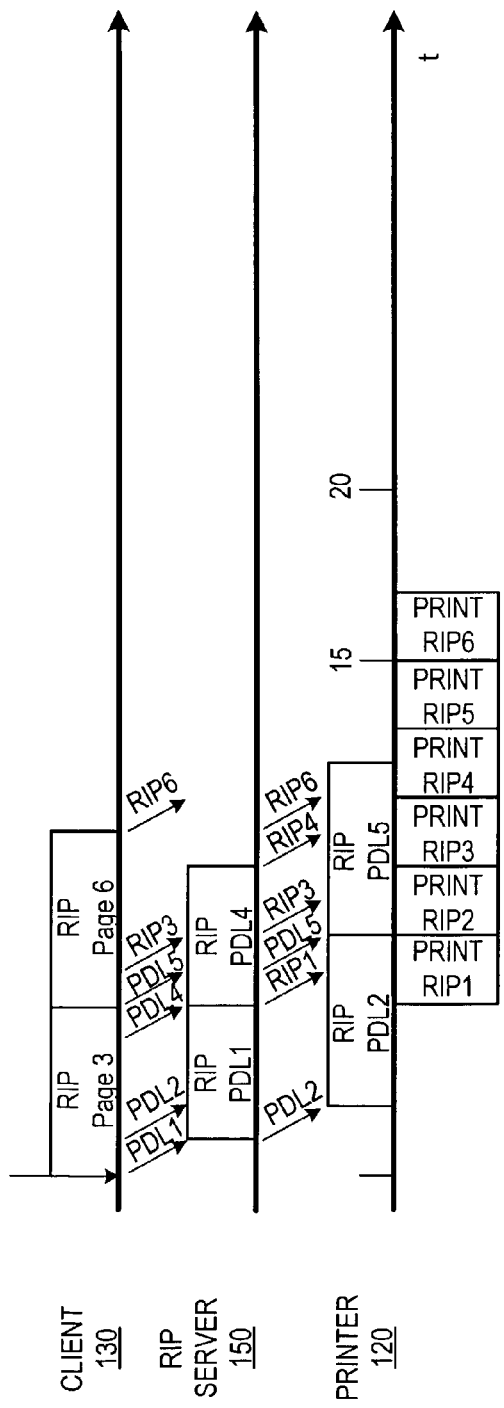
FIG. 14 illustrates a representative timing diagram for a messaging configuration such as shown in FIG. 13 that allows page reordering.

As a third observation, where not all devices in the print stream RIP at the same speed, further improvement may be possible if the client and/or RIP server are allowed to change the order of pages in the print stream, with the PJL page tags used by the printer to arrange pages back into the proper print order. FIG. 14 shows an example of page rearrangement. This example assumes—though does not show explicitly—that load messaging is used to schedule pages for processing.

Like in the preceding example, client 130 begins by transferring the first two pages in PDL format to RIP server 150. But instead of passing PDL1 on to the printer, RIP server passes PDL2 to the printer and begins RIP on PDL1 itself, since the RIP server predicts that it can finish first.

As RIP server 150 proceeds, it communicates status for itself and for printer 120 back to client 130. Client 130 thus predicts that both the RIP server 150 and printer 120 will need additional PDL pages before they need RIP3. Accordingly, client 130 transfers PDL4 and PDL5 to RIP server 150 before transferring RIP3 to RIP server 150.

RIP server 150 completes RIP1 and sends it to printer 120, which begins printing RIP1. RIP server 150 detects that printer 120 will complete RIP of PDL2 before it is ready to print RIP3, so it holds RIP3 until after it transfers PDL5 to printer 120 (RIP server 150 has already begun RIP on PDL4).

The PJL interpreter on printer 120 detects the out-of-order page transmission, and forces synchronization between the printer's renderer and spooler to print pages in the proper print order.

It can be appreciated from this example that using some form of load messaging, particularly in conjunction with out-of-order print streaming, can be used to keep the printer renderer busy, the RIP server busy (while allowing balancing when other RIP server tasks appear), and the client busy only to the extent necessary. Out-of-order print streaming has one use for small print jobs, since it allows better efficiency before a pipeline is filled.

Those skilled in the art recognize that print drivers, spoolers, print processors, etc. are typically implemented in software on clients and RIP servers, and in firmware where applicable on printers. Those skilled in the art will also recognize that in order to perform load balancing, an application, driver, print processor, etc. must comprehend the sheet assembly options available for the printer, and thus in what order the printer expects the pages for any option that is selected. It is also apparent that load-balancing can cross job boundaries, where more than one print job resides in the spooler queue (the load-balancing logic can consider adjacent jobs as a continuous stream to be optimized, thus avoiding some of the delay caused by restarting the print-processing pipeline anew with each new job). And just because such a load-sharing capability exists does not mean that it must be used on every print job. Some print jobs, particularly shorter jobs, may be better served without a mixed-mode print stream.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, other intermediate print-processing nodes could be included in a processing path in addition to the first RIP server, and could even be included dynamically as needed. A RIP server can serve multiple printers simultaneously, each of which supports load balancing. A RIP driver module and a PDL driver module could operate serially, e.g., the PDL driver converts the print stream to mixed EMF/PDL, and the RIP driver rasterizes the EMF pages. An embodiment could also be largely implemented in a separate component added to an existing print subsystem (e.g., a Print Assist). The Print Assist can, for example, receive despooled EMF or PDL data from a print processor and select a subset of pages to rasterize. Such minor modifications are encompassed within the invention, and are intended to fall within the scope of the claims.

Although a Windows operating system example is shown, the present invention is not limited to such environments, but can be employed in Apple OS, Linux and Unix (in various versions), and other operating system environments. Likewise, although PostScript has been specifically mentioned as a Page Description Language, as used herein that term would apply to any instruction-oriented representation of graphical data.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A print device comprising:
a marking engine;
a renderer capable of rasterizing PDL-format pages;
an interpreter capable of parsing a print stream comprising at least one page in PDL format and at least one page in raster format, and passing PDL-format pages to the renderer and raster-format pages to the marking engine; and
a scheduler to interleave raster-format pages from the renderer with raster-format pages from the interpreter such that raster-format pages are received by the marking engine in proper print order,
a memory structure capable of transferring a received raster-format page from the interpreter to the marking engine while a separate PDL-format page is rasterized by the renderer.

2. The print device of claim 1 further comprising a load synchronizer to communicate with a remote source of a print stream, the load synchronizer capable of communicating rasterization progress for the renderer to the remote source.

3. A system including, a RIP server comprising:
a buffer to receive print stream data from print clients;
a renderer to translate PDL-format page data to raster-format page data;
a spooler having print stream inputs connectable to the buffer output and the renderer output, and print stream outputs connectable to the renderer input and server output, the spooler capable of routing at least one PDL-format page from the buffered print stream through the renderer before placing that page at the server output; and
a page-processing selector to select a subset of the pages in a mixed raster/PDL render-format print stream for routing by the spooler through the renderer, and a print device comprising:
a marking engine;
a renderer capable of rasterizing PDL-format pages;
an interpreter capable of parsing a print stream comprising at least one page in PDL format and at least one page in raster format, and passing PDL-format pages to the renderer and raster-format pages to the marking engine; and
a scheduler to interleave raster-format pages from the renderer with raster-format pages from the interpreter such that raster-format pages are received by the marking engine in proper print order,
a memory structure capable of transferring a received raster-format page from the interpreter to the marking engine while a separate PDL-format page is rasterized by the renderer.

4. The system of claim 3, further comprising a job language command interpreter in communication with the page processing selector, the job language command interpreter capable of examining received print stream data having a mixed raster/PDL render format, with pages in PDL format demarcated from pages in raster format by job language commands, the job language command interpreter indicating to the page-processing selector the location of pages in the print stream that are not in raster format.

5. The system of claim 4, wherein the job language interpreter has the capability to remove, add, and/or modify the demarcating job language commands from the print stream whenever the page-processing selector selects a page for rasterization.

6. The system of claim 5, wherein the page processing selector has the capability to select all pages in the print stream not in raster format, from a mixed render format print stream, for routing to the renderer.

7. The system of claim 5, wherein the page processing selector has the capability to select the subset of pages from the print stream to place in raster format while leaving some pages in PDL format.

* * * * *